United States Patent
Jensen

(10) Patent No.: US 6,527,348 B2
(45) Date of Patent: Mar. 4, 2003

(54) BRAKING SYSTEM FOR A CONSTRUCTION MACHINE

(75) Inventor: Jeffrey E. Jensen, Chicago, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/862,962

(22) Filed: May 22, 2001

(65) Prior Publication Data

US 2002/0175561 A1 Nov. 28, 2002

(51) Int. Cl.[7] ............................. B60T 13/00; B60T 8/88; B60T 13/66
(52) U.S. Cl. .................... 303/9.63; 303/122.04; 303/20; 303/113.1
(58) Field of Search ................ 303/3, 2, 20, 9, 303/122, 122.04, 122.05, DIG. 9, DIG. 10, 9.61, 113.1, 9.63, 6.01

(56) References Cited

U.S. PATENT DOCUMENTS

| | | | |
|---|---|---|---|
| 3,692,366 A | * | 9/1972 | Campanini ..................... 303/9 |
| 4,418,963 A | | 12/1983 | Sprockhoff |
| 4,861,115 A | * | 8/1989 | Petersen ....................... 303/15 |
| 4,917,443 A | * | 4/1990 | Kramer et al. .......... 303/122.04 |
| 5,145,239 A | * | 9/1992 | Meise et al. .................. 303/20 |
| 5,294,190 A | * | 3/1994 | Feldmann et al. .............. 303/3 |
| 5,301,769 A | | 4/1994 | Weiss |
| 5,407,260 A | * | 4/1995 | Isshiki et al. ............. 303/113.1 |
| 5,443,306 A | | 8/1995 | Broome |
| 5,460,434 A | | 10/1995 | Micke et al. |
| 5,558,163 A | | 9/1996 | Hollstein |
| 5,632,530 A | | 5/1997 | Brearley |
| 5,749,633 A | | 5/1998 | Baumgartner |
| 5,788,341 A | | 8/1998 | Penrod et al. |
| 5,816,667 A | | 10/1998 | Jokic |
| 5,823,636 A | | 10/1998 | Parker et al. |
| 5,853,229 A | | 12/1998 | Willmann et al. |
| RE36,152 E | | 3/1999 | Hosseini et al. |
| 5,895,098 A | | 4/1999 | Stacey et al. |
| 6,007,160 A | | 12/1999 | Lubbers et al. |
| 6,022,084 A | | 2/2000 | Horn et al. |
| 6,149,247 A | | 11/2000 | Hofmann et al. |
| 6,354,671 B1 | * | 3/2002 | Feldmann et al. .............. 303/3 |

OTHER PUBLICATIONS

Statutory Invention Registration H1, 822, Dec. 7, 1999 Craig B. Kelley et al.

* cited by examiner

*Primary Examiner*—Jack Lavinder
*Assistant Examiner*—Thomas J. Williams
(74) *Attorney, Agent, or Firm*—Liza J Meyers

(57) ABSTRACT

A braking system for a construction machine includes service brakes operated by service valves to which pressure fluid is supplied by a safety valve which affords protection against unintentional application of the service brakes upon failure or malfunction of a braking system component.

20 Claims, 2 Drawing Sheets

BRAKING SYSTEM FOR A CONSTRUCTION MACHINE

TECHNICAL FIELD

This invention relates to a braking system particularly suited to construction machines and more particularly to a reliable braking system which prevents unintended braking or loss of braking capability upon malfunction or failure of certain functional components of the braking control system.

BACKGROUND

The need for a reliable service and parking brake system in large construction machines is increasingly important as these machines increase in size. It is also desirable that unintentional application of the service and parking brakes be avoided. Failure or malfunction of certain elements of service and/or parking brake control systems can result in unintentional braking. Unintentional braking is objectionable and some governmental jurisdictions prohibit operation of vehicles having barking systems that allow unintentional braking upon component malfunction or failure in the braking system. As the size of construction machines has increased, the noise to which the operator is subjected has also increased. Although insulation of the operator's cab reduces the noise level, there is a significant amount of noise transmitted to the cab by mechanical and fluid control apparatus and through openings for mechanical controls and fluid hoses extending into the cab. The various mechanical linkages and controls mounted in or extending into the cab complicates installation of the cab during manufacture of the construction machine. There is also a need to provide remote control for construction machines, such as for those operating in a hazardous or unhealthy environment.

Electro-hydraulic valves are used in a service brake control system disclosed in U.S. Pat. No. Re; 36,152 reissued on Mar. 16, 1999 to J. Hosseini et al for a Method and Apparatus for Controlling Differentially Driven Wheel-Slip for an Articulated Machine. The service brakes of this system are described as being either fluid pressure applied and spring-biased in a disengaged position or spring-biased in the engaged position and maintained in the disengaged position by fluid pressure. Upon failure or malfunction of certain components of this system, the brakes may be applied without the intention of the operator.

U.S. Pat. No. 5,749,633 issued May 12, 1998 to E. Bumgartner for a Brake by Wire System discloses use of a pair of electro-hyraulic valves in a braking system having a conventional master cylinder and an ABS/TCS brake controller supplemented by a brake by wire controller. Automotive master cylinders are not suitable for use in large construction machines and malfunction or failure of certain elements of this automotive braking system could result in unintentional application of one or more of the service brakes.

The present invention is directed to overcoming one or more of the problems as set forth above.

DISCLOSURE OF THE INVENTION

Each wheel of an axle of a construction machine is provided with a pressure fluid applied and spring released service brake which is actuated by pressure fluid delivered through an electrically controlled service valve. Pressure fluid is delivered to the service valves for the service brakes of the two wheels on the axle through an electrically controlled safety valve connected in pressure fluid receiving relation to a source of pressure fluid. The two service valves and the safety valve are controlled by an electric control which includes signal lines extending to a manually operated signal generating control in the cab. The service valves and the safety valve must all be shifted from their normally closed positions to open positions in order to apply the service brakes. This valve arrangement avoids unintentional application of the service brakes upon certain malfunctions or failures of components of the braking system. This braking arrangement also permits safe braking even if the safety valve locks up in an open position. A spring applied and pressure released parking brake may be provided on a transmission output shaft, the parking brake being released by pressure fluid delivered through an electrically controlled parking valve which is in turn controlled by a parking brake switch in the operator's cab.

The electric control for the braking system may include a primary electronic control module and, for safety purposes, a back-up electronic control module, both of which are preferably located on the machine outside the cab. Two sources of electric power and two sources of pressure fluid may be provided to ensure safe operation of the machine. The braking system of this invention is a brake by wire system with brake operating apparatus moved out of the cab and onto the chassis of the construction machine. This reduces the noise level in the cab and simplifies installation of the cab during manufacture of the machine.

BRIEF DESCRIPTION OF THE DRAWINGS

An embodiment of the invention is illustrated in the appended drawings, in which.

BEST MODE FOR CARRYING OUT THE OUT THE INVENTION

Figure 1:
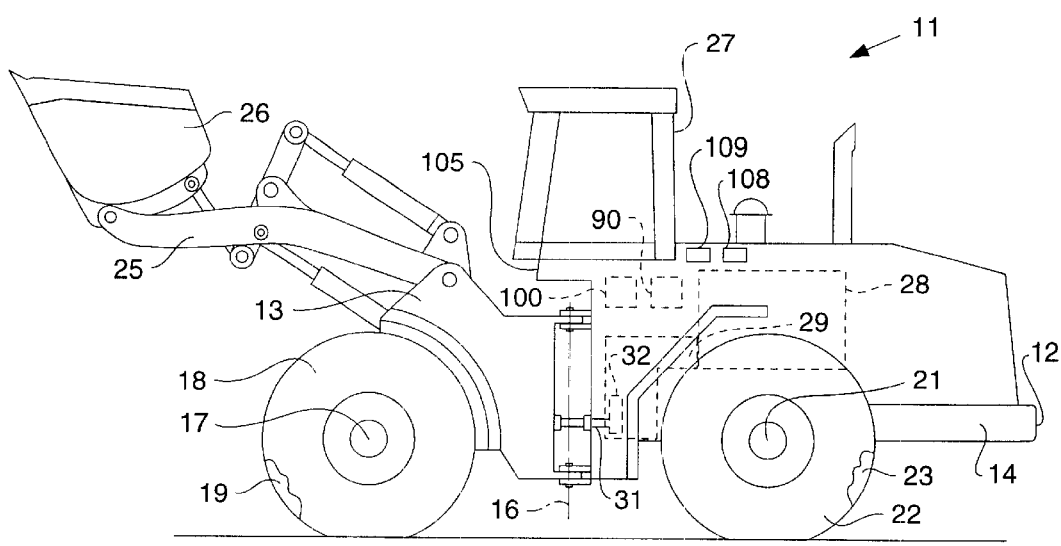
FIG. 1 is a side view of a wheel loader in which the present invention is advantageously utilized and FIG. 2 is a schematic illustration of a preferred embodiment of the braking system of this invention.

FIG. 1 illustrates a wheel loader 11 which has a chassis 12 made up of a front segment 13 and a rear segment 14 interconnected on a central vertical axis 16 about which the wheel loader 11 is steered by a power steering arrangement, not shown. The front segment 13 is supported by an axle 17 having a pair of laterally spaced wheels 18, 19 and the rear segment is supported by an axle 21 having a pair of laterally spaced wheels 22, 23. The front segment 13 supports a boom 25 with a bucket 26 at its forward end and the rear segment 14 supports an operator's cab 27. The rear segment 14 also supports an internal combustion engine or power unit 28 connected in driving relation to the wheels 17, 18, 22, 23 through a change speed transmission 29 having an output shaft 31 with which a spring applied and fluid pressure released parking brake 32 is operatively associated.

Figure 2:
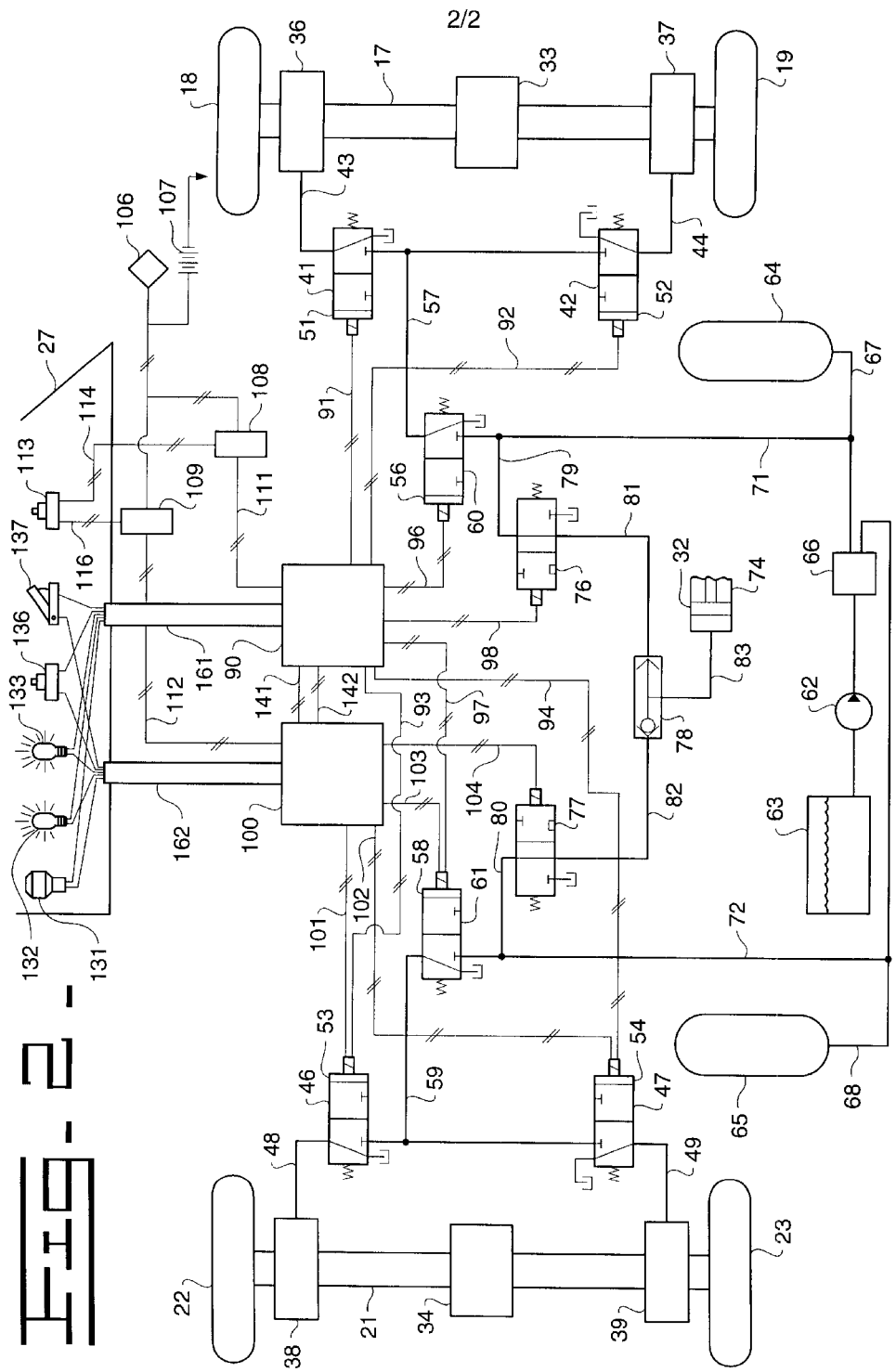

Referring to FIG. 2, in which the braking system is shown schematically, the wheels 18, 19, 22, 23 are driven through differentials 33, 34 and hydraulically applied and spring released service brakes 36, 37, 38, 39 are operatively associated with the wheels 18, 19, 23, 24, respectively, to control their rotation. A pair of electrically controlled proportional service valves 41, 42 are connected in fluid delivery relation to the service brakes 36, 37, respectively, by a pair of fluid conduits 43, 44 and a pair of electrically controlled proportional service valves 46, 47 are connected in pressure fluid delivery relation to the service brakes 38, 39 by a pair of fluid conduits 48, 49. The service valves 41, 42, 46, 47 have fluid flow control elements 51, 52, 53, 54, respectively, having fluid delivery and closed positions of adjustment. Pressure fluid delivery to the service valves 41, 42 is by way of an electrically controlled proportional safety valve 56 and a fluid service conduit 57 having branches connected in parallel to the service valves 41, 42. In a similar manner an electrically controlled proportional safety valve 58 is connected by a fluid service conduit 59 to the service valves 46, 47. The safety valves 56, 58 have fluid flow control elements 60, 61, each of which have fluid delivery and closed positions of adjustment. The flow control elements of all the service and safety valves 41, 42, 46, 47, 56, 58 are normally in their closed positions of adjustment and are proportionally opened depending on the amount of electric current delivered to those valves.

The wheel loader 11 includes a source of pressure fluid including an engine driven pump 62 drawing fluid from a reservoir 63 and delivering pressurized fluid to two accumulators 64, 65 by way of a double check valve 66 and fluid conduits 67, 68. The accumulator 64 is connected in pressure fluid delivery relation to the safety valve 56 by a fluid conduit 71 and the accumulator 65 is connected in pressure fluid delivery relation to the safety valve 58 by a fluid conduit 72.

The wheel loader 11 is also provided with a fluid control for its spring applied and fluid pressure released parking brake 32. A fluid pressure actuator 74 of the parking brake 32 is connected in pressure fluid receiving relation to the accumulators 64, 65 via electrically controlled parking valves 76, 77 and a shuttle valve 78. The parking valves 76, 77 are connected in pressure fluid receiving relation to the fluid conduits 71, 72 by fluid conduits 79, 80, respectively, a pair of inlet ports of the shuttle valve 78 are connected in pressure fluid receiving relation to the parking valves 76, 77 by a pair of fluid conduits 81, 82 and a fluid conduit 83 connects an outlet port of the shuttle valve 78 to the fluid actuator 74 of the parking brake 32.

An electrical control is provided for operating the parking brake 32 and the safety and service brakes 32, 36, 37, 38, 39, which includes a primary electronic control module 90 and a back-up electronic control module 100. The service valves 41, 42, 46, 47, the safety valves 56, 58 and the parking valve 76 are individually connected to outputs of the primary electronic control module 90 by electric lines 91, 92, 93, 94, 96, 97, 98, respectively. The service valves 46, 47 and the safety valve 58 associated with the service brakes 38, 39 of the rear axle 21 and the parking valve 77 are individually connected to outputs of the back-up electronic control module 100 by electric lines 101, 102, 103, 104, respectively. As shown in FIG. 1, the control modules 90 and 100 are mounted on the rear segment 14 of the wheel loader chassis 12 at a location outside of the cab 27. The service valves 41, 42, 46, 47, the safety valves 56, 58 and the parking valves 76, 77 may be located in a console 105 beneath the operator's cab 27 or elsewhere outside the cab 27. The pressure fluid supply system is also carried by the chassis 12 outside of the cab 27.

The electric control includes an electric power supply for the brake control system which connects the primary and back-up electronic control modules 90, 100 to two power sources, namely, an engine driven generator 106 and a battery 107. The generator 106 and the battery 107 are jointly connected in power delivery relation to a pair of relays 108, 109 which in turn connected in power delivery relation to the control modules 90, 100, respectively, by a pair of electric lines 111, 112. The relays 108, 109 are operated by a manually operated ignition type power switch 113 which is located in the cab 27 and connected to the relays 108, 109 by a pair of electric lines 114, 116. As illustrated, the sources of electric power 106, 107 and the relays 108, 109 are located outside of the operator's cab 27.

In addition to the power switch 113, the various manually operated controls and warning devices located in the operator's cab 27 include a buzzer 131, a pair of warning lights 132, 133, a parking brake switch 136 and a manually moveable service brake control 137 which are connected by signal lines to inputs of the primary and back-up electronic control modules 90, 100 by way of a primary sheathing harness 161 and a back-up sheathing harness 162. The service brake control 137 is a foot operated control with three pedal position sensors, not shown. The three sensors simultaneously sense the position of the brake control 137 and three position sensing signals are transmitted to the primary electronic control module 90 and three signals are transmitted to the back-up electronic control module 100. The three lines actually employed to transmit the triple redundancy signals to each of the control modules 90, 100 are represented by single lines in FIG. 2. If one of the sensors fails, the active one of the control modules 90, 100 judges displacement of the brake control 137 based on two signals. Two correct signals override a wrong third signal. If only two position sensors were used, the active control module would not ascertain which signal was correct. The active one of the control modules 90, 100 delivers current to the service and safety valves it controls in proportion to the sensed position of the brake control 137 and those service and safety valves deliver pressure fluid to the service brakes with which they are associated to effect braking in proportion to the position of the brake control 137.

The primary and back-up electronic control modules 90, 100 are interconnected by a controller area network (CAN) datalink 141 and a diagnostic signal wire 142 by which data is shared and by which the outputs of the back-up control module 100 which operate the service and safety valves 46, 47, 48 are activated upon the back-up control module 100 sensing output failure of the primary control module 90. The output of the back-up control module 100 connected to the parking valve 77 is always active when the machine is operating.

Industrial Applicability

The braking system of this invention is particularly useful in construction machinery such as wheel loaders. This invention provides a brake by wire system that contributes to a quieter operator's cab, and simplifies installation of the cab during manufacture of the construction machine. Braking by wire is a key segment of a complete drive by wire machine which may be operated by remote control. A drive by wire machine makes possible a complete or partial autonomous operation in construction, mining and landfill operations.

The use of electrically controlled proportional service valves 41, 42, 46, 47 for controlling the flow of pressure fluid to the service brakes 36, 37, 38, 39 permits individual adjustment of the brake pressure at individual wheels. The use of an electrically controlled proportional safety valve 56 between the source of pressure fluid and the service valves 41, 42 for the front axle brakes 36, 37 and the use of the same type of safety valve 58 between the source of pressure fluid and the service valves 46, 47 for the rear axle brakes 38, 39 prevents the unintentional application of the service brakes 36, 37, 38, 39 in event of failure or malfunction of some braking system components. For instance, the service brakes 36, 37 cannot be applied unless the electrically controlled service valves 41, 42 and the safety valve 56 are electrically energized. If any one of the electric lines 91, 92 or 96 should be erroneously energized, the service brakes 36, 37 will not be applied. If either of the flow control elements 51, 52 of the service valves 41, 42 becomes hung up in its fluid delivery position of adjustment, the associated service brake will not be applied because the flow control element 60 of the safety valve 56 will be in its illustrated closed position in which fluid conduit 57 is connected to reservoir. If the operator operates the brake control 137 when ore or both of the flow control elements 51, 52 are hung up in an open position, the electrically controlled proportional safety valve 56 will supply pressure fluid to the brakes 36, 37 to provide braking effort in proportion to the position of the brake control 137. If either one of the safety valves 56, 58 fails in an open position, the associated service brakes 36, 37 or 38, 39 can be applied and released by operation of the associated service valves 41, 42 or 46 47 in response to movement of the brake control 137.

An output failure of the primary electronic control module 90 is sensed by the back-up electronic control module 100 via the interconnecting datalink 141, and the outputs for electric lines 101, 102, and 103 of the back-up electronic control module 100 are automatically activated to provide machine operator control for the service brakes 38, 39 of the rear axle 21 and the parking brake 32.

When the parking brake switch 134 is operated, the parking valves 76, 77 are moved from their illustrated open positions of adjustment to closed positions of adjustment in which the parking valve 76 connects the fluid conduit 81 to reservoir and the parking valve 77 connects the fluid conduit 82 to reservoir. Failure of either control module 90 or 100 does not disable the parking brake 32. By using two accumulators 64, 65, the parking brake 32 will not be unintentionally applied in case of failure of one of the accumulators 64, 65. Also by using two accumulators 64, 65, the parking brake 32 can be applied and released, in event one of the accumulators fail.

Other aspects, objects and advantages of this invention can be obtained from a study of the drawings, the disclosure and the appended claims.

What is claimed is:

1. A braking system for a construction machine having an opertor's cab mounted on a chassis supported in part by an axle having a pair of laterally spaced wheels driven by a power unit through a transmission having an output shaft, said braking system comprising:

a fluid pressure applied and spring released service brake operatively associated with each of said wheels;

an electrically controlled service valve connected in pressure fluid delivery relation to each of said service brakes;

an electrically controlled safety valve connected in pressure fluid delivery relation to said service valves;

each of said service and safety valves having flow control elements adjustable between fluid delivery and closed positions;

a source of pressure fluid connected to said safety valve;

an electric control connected in controlling relation to said service and safety valves including a manually moveable service brake control in said cab, all of said valves being adjusted to a fluid delivery position upon a predetermined movement of said service brake control;

a primary electronic control module and a back-up electronic control module;

normally inactive electric lines connecting said back-up electronic control module in controlling relation to at least one safety valve and to at least one service valves connected in fluid receiving relation to said safety valve;

said service brake control being connected in controlling relation to said back-up electronic control module;

a communication link between said control modules causing automatic activation of said normally inactive electric lines connected to said back-up electronic control module upon failure of said primary electronic control module, operation of said service brake control, when said back-up electronic control module is active, causing corresponding adjustment of said safety valve and the associated service valves to their fluid delivery positions;

a spring applied and pressure fluid released parking brake operatively associated with said output shaft;

a shuttle valve having a pair of inlets and an outlet, said outlet being connected in fluid communication with said parking brake, said source of pressure fluid including a fluid reservoir, first and second accumulators, a pump connected in fluid receiving relation to said reservoir and in fluid delivery relation to said accumulators;

a first electrically controlled parking valve connected in fluid receiving relation to said first accumulator and in fluid delivery relation to one of said inlets of said shuttle valve;

a second electrically controlled parking valve connected in fluid receiving relation to said second accumulator and in fluid delivery relation to the other of said inlets of said shuttle valve;

an electric line connecting said first parking valve to said primary electronic control module;

an electric line connecting said second parking valve to said back-up electronic control module;

a parking brake switch in said cab; and a pair of signal lines connecting said parking brake switch to said primary and back-up electronic control modules, respectively.

2. The braking system as set forth in claim 1, wherein said safety valve is connected to said service valves by a fluid service conduit, said fluid service conduit being connected to a reservoir when said safety valve is in said closed position, in event said control element of one of said service valves becomes stuck in an open position, said brake associated with said stuck control element will be released, upon release of said service brake control, by said flow control element of said safety valve connecting said fluid service conduit to reservoir upon its movement to said closed position, thereby relieving the fluid pressure applied to said associated brake.

3. The braking system as set forth in claim 1 wherein said service brakes are controlled by operation of said service valves in event said control element of said safety valve becomes stuck in its open position.

4. The braking system as set forth in claim 1 wherein said electric control includes a primary electronic control module, said primary electronic control module being connected in controlled relation to said manually moveable service brake control and having outputs connected in controlling relation to said service and safety valves.

5. The braking system as set forth in claim 4 wherein said electric control includes a back-up electronic control module connected in controlled relation to said service brake control and having outputs connected in controlling relation to said service and safety valves, said outputs of said back-up electronic control module connected to said service and safety valves being inactive when said primary electronic control module is active.

6. The braking system as set forth in claim 5 wherein said electric control includes a communication link between said electronic control modules by which said outputs of said back-up electronic control module for said service and safety valves are activated upon failure of said primary electronic control module.

7. The braking system as set forth in claim 6 wherein said electric control includes first and second sources of electric power, first and second electric relays connected in electric power receiving relation to said sources of electric power and in electric power delivery relation to said primary and back-up electronic control modules, respectively, and a power switch in said cab connected in controlling relation to said electric relays.

8. The braking system as set forth in claim 7 wherein said control modules, said valves, said sources of electric power and said relays are supported on said chassis outside of said cab.

9. The braking system as set forth in claim 1 including:
a spring applied and fluid pressure released parking brake operatively associated with said output shaft of said transmission;
an electrically controlled parking valve connected in pressure fluid receiving relation to said source of pressure fluid and in pressure fluid delivery relation to said parking brake, said parking valve being adjustable between a normally open fluid delivery position and a closed position, said electric control including a manually operated parking brake switch in said cab, said parking valve being adjusted to its closed position upon actuation of said parking brake switch.

10. The braking system as set forth in claim 9 wherein said electric control includes a primary electronic control module, said primary electronic control module being connected in controlled relation to said service brake control and to said parking brake switch and having outputs connected in controlling relation to said service, safety and parking valves.

11. The braking system as set forth in claim 10 wherein said electric control includes a back-up electronic control module, said back-up electronic control module being connected in controlled relation to said service brake control and said parking brake switch and having outputs connected in controlling relation to said service, safety and parking valves, said outputs of said back-up electronic control module connected to said service and safety valves being inactive when said primary electronic control module is active.

12. The braking system as set forth in claim 11 wherein said electric control includes a communication link between said electronic control modules by which said outputs of said back-up electronic control module controlling said service and safety valves are activated upon failure of said primary electronic control module.

13. The braking system as set forth in claim 12 wherein said electric control includes first and second sources of electric power, first and second electric relays connected in power receiving relation to said sources of electric power and in power delivery relation to said primary and back-up electronic control modules, respectively, and a power switch in said cab connected in controlling relation to said electric relays.

14. The braking system as set forth in claim 13 wherein said control modules, said valves, said sources of electric power and said electric relays are located on said chassis outside of said cab.

15. A braking system for a construction machine having an operator's cab mounted on a chassis supported by a pair of axles, each axle having a pair of laterally spaced wheels driven by a power unit through a transmission having an output shaft, said braking system comprising;
a fluid pressure applied and spring released service brake operatively associated with each of said wheels;
an electrically controlled service valve connected in pressure fluid delivery relation to each of said service brakes;
a first electrically controlled safety valve connected in fluid delivery relation to said service valves for said service brakes associated with said wheels on one of said axles;
a second electrically controlled safety valve connected in fluid delivery relation to said service valves for said brakes associated with said wheels on the other of said axles;
said service and safety valves having fluid delivery and closed positions of adjustment;
a source of pressure fluid corrected to said safety valves;
a primary electronic control module;
electric lines individually connecting said service and safety valves in controlled relation to said primary electronic control module;
a manually moveable service brake control in said cab corrected in controlling relation to said first electronic control module, all of said service and safety valves being adjusted to fluid delivery positions upon actuation of said service brake control;
a back-up electronic control module;
normally inactive electric lines connecting said back-up electronic control module in controlling relation to said first safety valve and to said service valves connected in fluid receiving relation to said first safety valve;
said service brake control being connected in controlling relation to said backup electronic control module;
a communication link between said control modules causing automatic activation of said normally inactive electric lines connected to said back-up electronic control module upon failure of said primary electronic control module, operation of said service brake control, when said back-up electronic control module is active, causing corresponding adjustment of said first safety valve and the associated service valves to their fluid delivery positions;
a spring applied and pressure fluid released parking brake operatively associated with said output shaft;
a shuttle valve having a pair of inlets and an outlet, said outlet being connected in fluid communication with said parking brake;
said source of pressure fluid including a fluid reservoir, first and second accumulators, a pump connected in fluid receiving relation to said reservoir and in fluid delivery relation to said accumulators;
a first electrically controlled parking valve connected in fluid receiving relation to said first accumulator and in fluid delivery relation to one of said inlets of said shuttle valve;
a second electrically controlled parking valve connected in fluid receiving relation to said second accumulator and in fluid delivery relation to the other of said inlets of said shuttle valve;

an electric line connecting said first parking valve to said primary electronic control module;

an electric line connecting said second parking valve to said back-up electronic control module;

a parking brake switch in said cab; and a pair of signal lines connecting said parking brake switch to said primary and backup electronic control modules, respectively.

16. The braking system as set forth in claim 15 wherein said source of pressure fluid includes a first accumulator connected in pressure fluid delivery relation to said first safety valve and a second accumulator connected in pressure fluid delivery relation to said second safety valve.

17. The braking system as set forth in claim 15 including first and second sources of electric power, first and second electric relays connected in electric power receiving relation to said sources of electric power and in electric power delivery relation to said primary and back-up electronic control modules, respectively, and a power switch in said cab connected in controlling relation to said relays.

18. The braking system as set forth in claim 15 including first and second sources of electric power, first and second electric relays connected in electric power receiving relation to said sources of electric power and in electric power delivery relation to said primary and back-up electronic control modules, respectively, and a power switch in said cab connected in controlling relation to said electric relays.

19. The braking system as set forth in claim 18 wherein said control module, said valves, said sources of electric power, and said electric relays are mounted on said chassis outside of said cab.

20. A method of providing a reliable braking system for a construction machine having a chassis supporting an operator's cab, a pair of axles supporting said chassis and a power unit driving a pair of wheels on each axle through an output shaft of a transmission connected in driven relation to said power unit, said method comprising the steps of:

providing a fluid pressure applied and spring released service brake for each wheel;

providing an electrically operated service valve for each service brake, said service valves having fluid delivery and closed positions of adjustment;

providing a first electrically controlled safety valve connected in fluid delivery relation to said service valves associated with said brakes on one of said axles;

providing a second electrically controlled safety valve connected in fluid delivery relation to said service valves associated with said brakes on the other of said axles;

providing a primary electronic control module capable of transmitting electricity from its outputs upon receipt predetermined control signals at one or more of its inputs.

connecting electric lines between each of said valves and said primary electronic control module;

providing a manually operable service brake control in said operator's cab;

connecting said service brake control to one of said inputs of said primary electronic control module;

providing a back-up electronic control module having inputs and outputs and the capability-to delivery electricity through one or more of said outputs upon receipt of a predetermined signal via one or more said inputs;

connecting normally inactive individual electric lines from said outputs of said back-up electronic control module to said safety valve and to each of said service valves associated with said brakes for said wheels on one of said axles;

connecting said service brake control to one of said inputs of said back-up electronic control module;

connecting said control modules to one another by a communication link by which said electric lines from said back-up control module to said service and safety valves associated with said one axle are activated to a fluid delivery position upon failure of said primary electronic control module;

providing a source of pressure fluid connected to said safety valves;

providing a parking brake operatively associated with said output shaft;

providing a shuttle valve having at least one inlet and outlet, said outlet being connected in fluid communication with said parking brake;

providing first and second parking valves connected in fluid receiving relation to said source of pressure fluid; and connecting cach of said first and second parking valves to at least one of said primary and back-up electronic control modules.

* * * * *

UNITED STATES PATENT AND TRADEMARK OFFICE
CERTIFICATE OF CORRECTION

PATENT NO.    : 6,527,348 B2
DATED         : March 4, 2003
INVENTOR(S)   : Jeffrey E. Jensen It is certified that error appears in the above-identified patent and that said Letters Patent is hereby corrected as shown below:

<u>Column 8,</u>
Line 32, should read -- connected in controlling relation to said first electronic --

Signed and Sealed this

Twenty-fourth Day of June, 2003

JAMES E. ROGAN
*Director of the United States Patent and Trademark Office*